(12) United States Patent
Nagayasu (10) Patent No.: US 9,701,221 B2
(45) Date of Patent: Jul. 11, 2017

(54) VEHICLE SEAT

(71) Applicant: TOYOTA BOSHOKU KABUSHIKI KAISHA, Aichi-ken (JP)

(72) Inventor: Hidetaka Nagayasu, Aichi-ken (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 14/208,249

(22) Filed: Mar. 13, 2014

(65) Prior Publication Data

US 2014/0284981 A1    Sep. 25, 2014

(30) Foreign Application Priority Data

Mar. 21, 2013  (JP) ................................ 2013-057989

(51) Int. Cl.
*B60N 2/22* (2006.01)
*A47C 1/032* (2006.01)
*A47C 1/023* (2006.01)

(52) U.S. Cl.
CPC ............. *B60N 2/22* (2013.01); *B60N 2/2209* (2013.01); *A47C 1/023* (2013.01); *A47C 1/032* (2013.01)

(58) Field of Classification Search
CPC ....... A47C 1/032; A47C 1/023; B60N 2/3011; B60N 2/3065
USPC ....... 297/340, 341–343, 344.15, 376, 216.19
See application file for complete search history.

(56) References Cited

U.S. PATENT DOCUMENTS

| | | | |
|---|---|---|---|
| 5,868,466 A | 2/1999 | Massara et al. | |
| 6,641,214 B2 * | 11/2003 | Veneruso | B60N 2/0232 297/216.15 |
| 7,703,851 B2 * | 4/2010 | Nakaya et al. | 297/344.15 |
| 8,038,198 B2 * | 10/2011 | Yamagishi | B60N 2/12 296/90 |

FOREIGN PATENT DOCUMENTS

| | | |
|---|---|---|
| CN | 2709237 | 7/2005 |
| CN | 101443236 | 5/2009 |
| CN | 101516674 | 8/2009 |

(Continued)

OTHER PUBLICATIONS

Office Action issued in China Counterpart Patent Appl. No. 201410102981.0, dated Dec. 3, 2015 , along with an English translation thereof.

(Continued)

*Primary Examiner* — Syed A Islam
(74) *Attorney, Agent, or Firm* — Greenblum & Bernstein, P.L.C.

(57) ABSTRACT

A vehicle seat, which adjusts an inclination angle of a seat back with respect to a seat cushion through a recliner, includes a base member, a bracket, which supports the seat back so that the seat back is able to move, and is fixed to a rotation side of the recliner, a connecting member that connects the seat cushion and the seat back with each other, a first guide mechanism that guides the seat back with respect to the bracket, and a second guide mechanism that guides the seat cushion with respect to the base member. The seat back and the seat cushion are guided by the first guide mechanism and the second guide mechanism, respectively, so that the seat back and the seat cushion move rotationally about a position corresponding to a hip-point of a seated occupant.

4 Claims, 6 Drawing Sheets

(56) References Cited

FOREIGN PATENT DOCUMENTS

| | | |
|---|---|---|
| DE | 3822877 | 1/1990 |
| DE | 102007059986 | 6/2009 |
| JP | 59-68449 | 5/1984 |
| JP | 61-56609 | 3/1986 |
| JP | 06-5546 | 1/1994 |
| JP | 07-257242 | 10/1995 |
| JP | 2002-345589 | 12/2002 |
| JP | 2003-199641 | 7/2003 |
| JP | 2003-285674 | 10/2003 |
| JP | 2005-198979 | 7/2005 |
| JP | 2005-289133 | 10/2005 |
| JP | 2005-319341 | 11/2005 |
| JP | 2006-123715 | 5/2006 |
| JP | 2006-160217 | 6/2006 |
| JP | 2008-173278 | 7/2008 |
| JP | 2010-246599 | 11/2010 |

OTHER PUBLICATIONS

Office Action issued in Japan Counterpart Patent Appl. No. 2013-057989, dated Jun. 14, 2016 , along with an English translation thereof.

Office Action issued in Germany Counterpart Patent Appl. No. 102014204967.9, dated Mar. 30, 2017, along with an English translation thereof.

\* cited by examiner

FIG. 6

VEHICLE SEAT

INCORPORATION BY REFERENCE

The disclosure of Japanese Patent Application No. 2013-057989 filed on Mar. 21, 2013 including the specification, drawings and abstract is incorporated herein by reference in its entirety.

BACKGROUND OF THE INVENTION

1. Field of the Invention

The present invention relates to a vehicle seat in which an occupant is seated in an automobile, an airplane, and so on.

2. Description of Related Art

In a seat having a recliner, when the recliner is operated to tilt a seat back rearward, a phenomenon happens in which the seat back rises gradually while in contact with the back of the occupant, because the rotation center of the back of the occupant does not coincide with the rotation center of the seat back. Therefore, clothing of the occupant crawls up on the back of the occupant (herein after, referred to as a "back shift"), which gives the occupant discomfort. In order to prevent the phenomenon, a seat has been developed, in which a back shift does not happen when an inclination angle of a seat back is adjusted (see Japanese Patent Application Publication No. 2010-246599 A (JP 2010-246599 A) below).

SUMMARY OF THE INVENTION

However, the seat described in JP 2010-246599 A is developed mainly for a rear seat of a passenger vehicle, and is not applicable to a front seat having no vehicle body wall surrounding the seat. This is because the seat described in JP 2010-246599 A requires an engagement hole that is provided in the vehicle body wall surrounding the seat back, in order to adjust an inclination angle of the seat back. In the foregoing JP 2010-246599 A, it is stated that the seat is also applicable to a front seat, but no specific structure is disclosed. The present invention provides a vehicle seat that is able to prevent a back shift due to an adjustment of an inclination angle of a seat back, even in a seat without a vehicle body wall that surrounds a seat back, by providing an alternative member to the vehicle body wall adjacent to the seat back.

A vehicle seat according to an aspect of the present invention adjusts an inclination angle of a seat back with respect to a seat cushion through a recliner. The vehicle seat includes a base member, which is fixed to a floor of a vehicle in which the vehicle seat is installed, and supports a fixed side of the recliner, a bracket, which supports the seat back so that the seat back is able to move, and is fixed to a rotation side of the recliner, a connecting member that connects the seat cushion and the seat back with each other, a first guide mechanism that guides the seat back with respect to the bracket, and a second guide mechanism that guides the seat cushion with respect to the base member. The seat cushion is supported so as to be able to move with respect to the base member, and is connected to an end portion of the bracket so as to operate simultaneously with the bracket. Also, the seat back and the seat cushion are guided by the first guide mechanism and the second guide mechanism, respectively, so that the seat back and the seat cushion move rotationally about a position corresponding to a hip-point of a seated occupant as the bracket rotates about the recliner with an adjustment of an inclination angle of the seat back. According to the above aspect, the bracket and the base member are provided around the seat, and, when adjusting an inclination angle of the seat back, the seat back and the seat cushion are moved respectively by the guide mechanisms formed between the seat back and the bracket, and between the seat cushion and the base member, respectively, so that the seat back and seat cushion rotate about a position corresponding to a hip-point of a seated occupant. Therefore, it is possible to provide a vehicle seat that that prevents a back shift due to an adjustment of an inclination angle of the seat back even in the seat without a vehicle body wall around the seat back.

In the above aspect, the recliner and the bracket may be provided on both sides of the seat back, and the brackets on both sides may be integrally fixed to each other on a back side of the seat back. According to the above structure, the seat back is supported by the bracket at a position away from the recliner. However, since the brackets on both sides of the seat back are integrated with each other so as to sandwich the seat back, it is possible to prevent the brackets from being deformed to be separated from each other, thus enhancing strength for supporting the seat back.

In the above aspect, the connecting member may be integrally fixed to an end portion of the seat back on the seat cushion side, and, for the seat cushion, the connecting member may be engaged with a sliding groove, which is formed on the seat cushion side, through a sliding pin, and the sliding groove may be formed so as to allow the seat back to move with respect to the seat cushion with an adjustment of an inclination angle of the seat back. According to the above structure, the connecting member is integrally fixed to the seat back, and, the connecting member is fixed to the seat cushion by engagement between the sliding pin and the sliding groove so that the connecting member and the seat cushion are able to move with respect to each other. Therefore, when adjusting an inclination angle of the seat back, the seat back and the seat cushion are able to operate simultaneously, and the seat back and the seat cushion are also allowed to move with respect to each other.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

FIG. 1 to FIG. 6 show an embodiment of the preset invention. This embodiment is a case where the present invention is applied to a so-called "separate type automobile seat" in which one occupant is able to be seated. This automobile seat is able to slide in a front-rear direction and a left-right direction with respect to an advancing direction of an automobile. FIG. 2 to FIG. 6 only show a skeleton structure of the seat in order to simplify a characteristic structure of the present invention, and show a state where a cushion pad and a seat cover, which are overlaid on the skeleton structure, are removed. Arrows in each of the drawings indicate directions such as front, rear, left and right with regard to the advancing direction of an automobile. The automobile seat is supported so that back frames 10 in a seat back, and cushion frames 20 in a seat cushion are able to move with respect to base members 30. The base members 30 are provided so as to enclose the back frames 10 and the cushion frames 20 from below. Lower parts of the base members 30 are supported by slide boxes 72 through slide rails 71 in a right-left direction, and the slide boxes 72 are supported by a floor F of the automobile through slide rails (not shown) in a front-rear direction. Therefore, the base member 30 is supported indirectly by the floor F of the automobile.

The base member 30 includes a base member body 31 that forms a main part of the base member 30, and a base member bracket 32 provided in an upper part of the base member body 31. The base member bracket 32 is fixed to positions corresponding to the lower parts of the back frames 10 by two bolts 32A on both left and right sides of the base member body 31. A recliner 40 is welded and fixed to an inner side (the back frame 10 side) of each of the left and right base member brackets 32. Each of the recliners 40 includes a fixed side 41 and a rotation side 42 that rotate to each other as is known in the art, and the fixed side 41 of the recliner 40 is fixed to the base member bracket 32. A link member 51 is fixed to the rotation side 42 of the recliner 40 by bolting. The rotation side 42 of the recliner 40 and the link member 51 are fixed to each other by bolting in consideration of ease of assembly, but may be fixed to each other by welding depending on an assembly method. The link members 51 form a bracket 50 together with an upper arm 52, and the upper arm 52 is fixed to upper ends of each of the link members 51 by bolts 51B, 51B. The upper arm 52 is folded near both end portions of the upper arm 52, which are fixed to the link members 51, respectively, and is formed into a gate shape as a whole. Therefore, the bracket 50 is arranged so as to cover the back frames 10 from the back side. A rear end portion of each of the cushion frames 20 on the left and right is fixed through a hinge pin 51A to the other side of each of the link members 51, the other side being opposite across the recliner 40 to the side where the upper arm 52 is fixed.

Fixed brackets 11 are welded and fixed to areas in the back frames 10 on the left and right sides, corresponding to the upper arm 52. On the other hand, in areas in the upper arm 52 on the left and right, which correspond to the fixed brackets 11, long sliding holes 52A are formed along a longitudinal direction of the brackets 50 (a direction connecting a position in the link member 51 where the recliner 40 is fixed, and a position where the upper arm 52 is fixed). A weld nut 11A is welded and fixed to each of the fixed brackets 11, and a shoulder bolt 11B is fastened to the weld nut 11A. The shoulder bolt 11B passes through the sliding hole 52A, and a shoulder part in a distal end of the shoulder bolt 11B is engaged with the upper arm 52. In order to avoid direct contact between the upper arm 52 and the fixed bracket 11, a resin bush 11C is inserted between the upper arm 52 and the fixed bracket 11. Therefore, each of the shoulder bolts 11B serves as a sliding pin and is able to slide along the sliding hole 52A in a state where the shoulder bolt 11B is fixed to the back frame 10. The combination of the shoulder bolt 11B and the sliding hole 52A configures a first guide mechanism according to the present invention.

Sliding pins 22 are fixed to areas on the left and right sides of the cushion frames 20 and in front of the centers of the cushion frames 20 in the front-rear direction. The sliding pins 22 projects in the left and right directions, respectively. Corresponding to the sliding pins 22, long sliding holes 33 are formed in the base member bodies 31 in a generally front-rear direction. Therefore, the cushion frames 20 are guided by the sliding holes 33 through the sliding pins 22 and are thus able to move in the front-rear direction. The combination of the sliding pin 22 and the sliding hole 33 configures a second guide mechanism according to the present invention.

Lower arms (an example of a connecting member in the present invention) 60 are fixed to left and right lower ends of the back frames 10, respectively, by two bolts 62, 62 on each side. The back frame 10 and the lower arm 60 are fixed to each other by bolting in consideration of ease of assembly, but may be fixed to each other by welding depending on an assembly method. The lower arms 60 are symmetrical, and distal ends of the lower arms 60 extend to the front. At positions corresponding to the distal ends of the lower arms 60, cushion frame brackets 21 are provided, respectively. The cushion frame brackets 21 are welded and fixed to left and right upper parts of the cushion frames 20, respectively. Long sliding holes (an example of a sliding groove according to the present invention) 21A are formed in a generally upper-lower direction in the centers of the cushion frame brackets 21 at positions corresponding to the distal ends of the lower arms 60. Weld nuts 63 are welded and fixed to the distal ends of the lower arms 60, and shoulder bolts 61 are fastened to the weld nuts 63. The shoulder bolts 61 pass through the sliding holes 21A, and shoulder parts in distal ends of the shoulder bolts 61 are engaged with the cushion frame brackets 21, respectively. In order to avoid direct contact between the shoulder bolt 61 and the cushion frame bracket 21, a resin bush 64 is inserted between the shoulder bolt 61 and the cushion frame brackets 21. Therefore, each of the shoulder bolts 61 serves as a sliding pin and is able to slide along the sliding hole 21A in a state where the shoulder bolts 61 are fixed to each of the lower arms 60. In other words, when changing an inclination angle of the back frames 10 with respect to the cushion frames 20 while the back frames 10 are moving along the sliding holes 52A of the upper arm 52, the distal ends of the lower arms 60 are allowed to move with respect to the cushion frame brackets 21.

Figure 1:
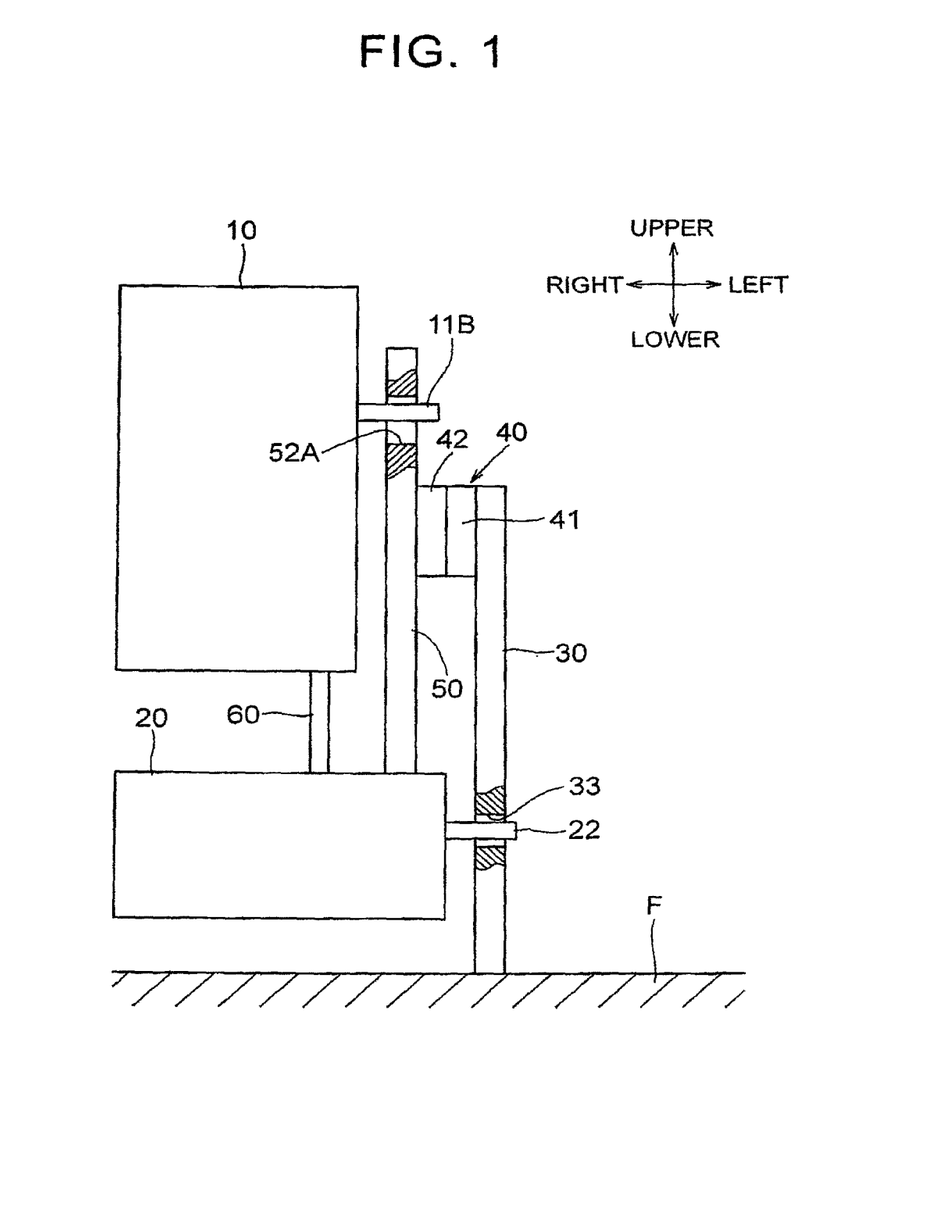
FIG. 1 is a schematic view showing a rough configuration of a first embodiment of the present invention.
Figure 2:
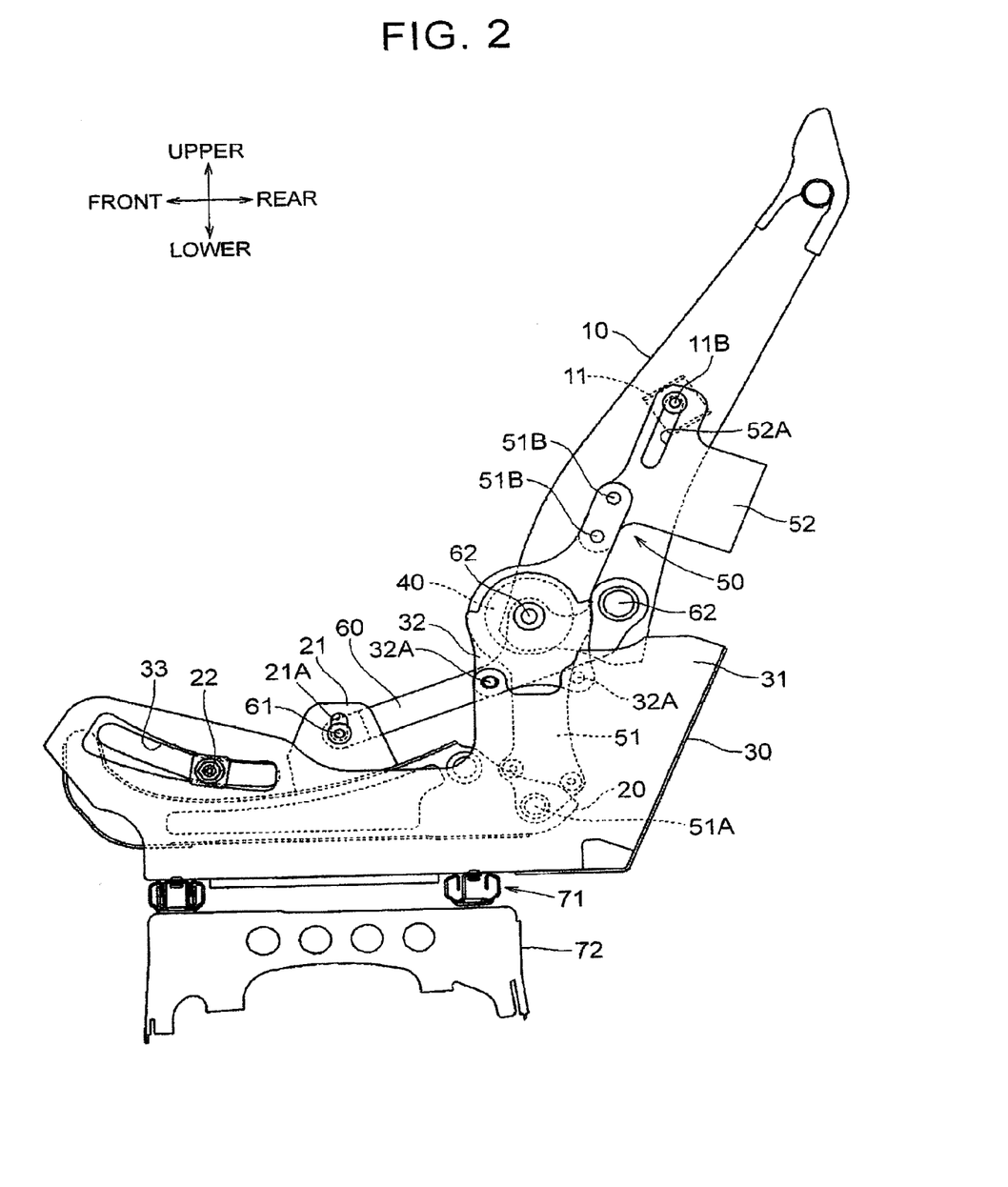
FIG. 2 is a side view showing a skeleton structure of the embodiment.
Figure 3:
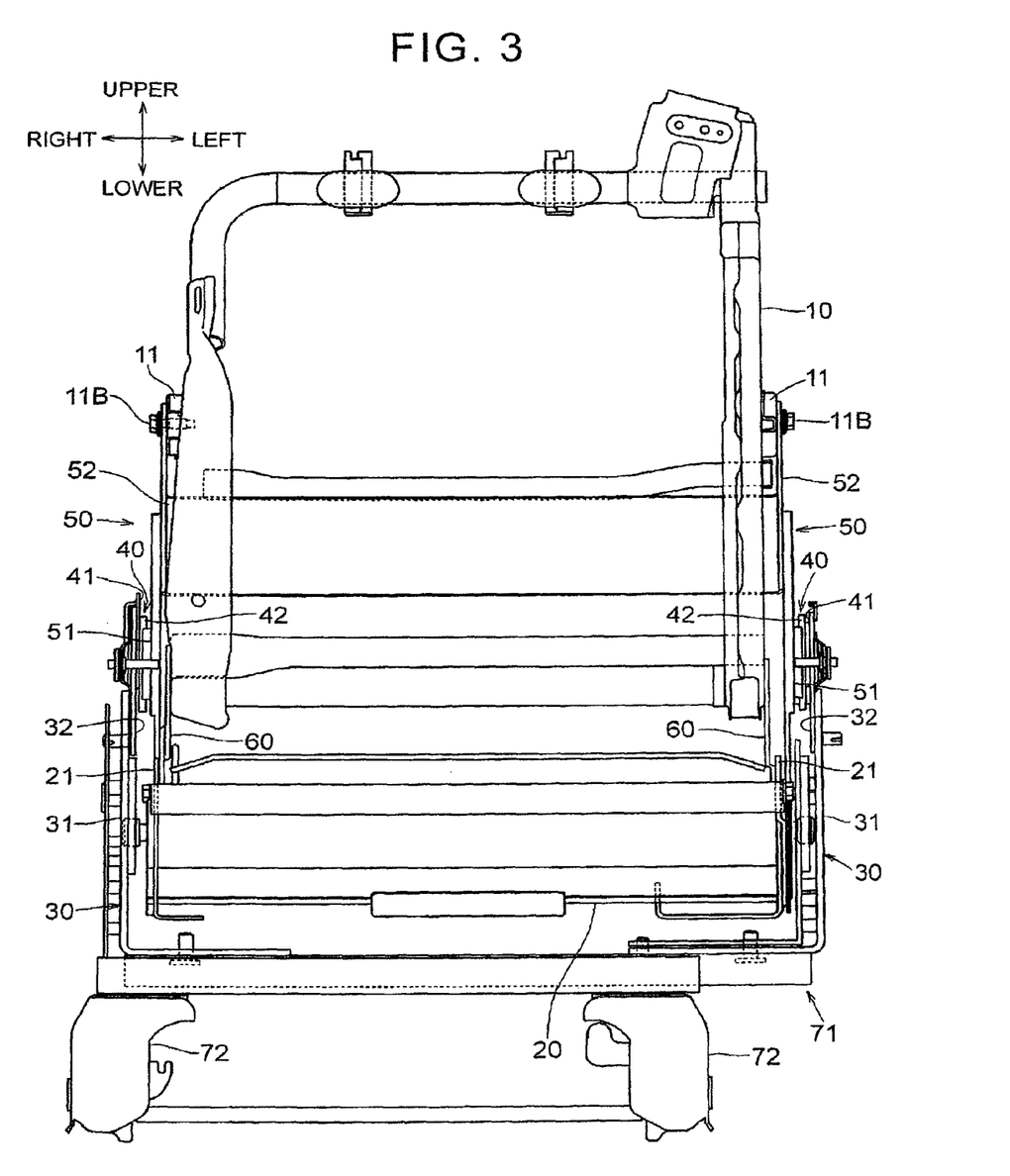
FIG. 3 is a front view showing the skeleton structure of the embodiment.
Figure 4:
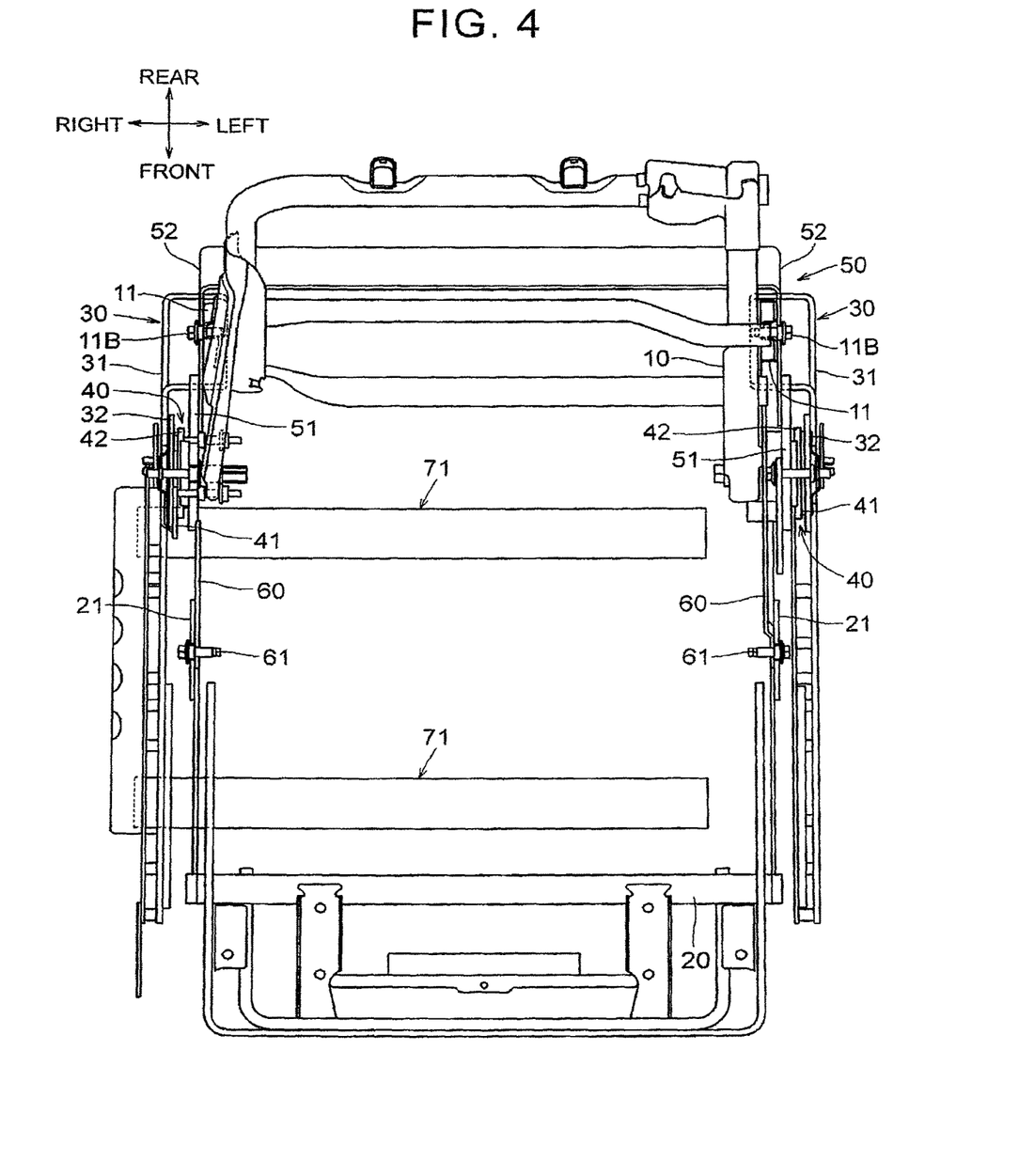
FIG. 4 is a plan view showing the skeleton structure of the embodiment.
Figure 5:
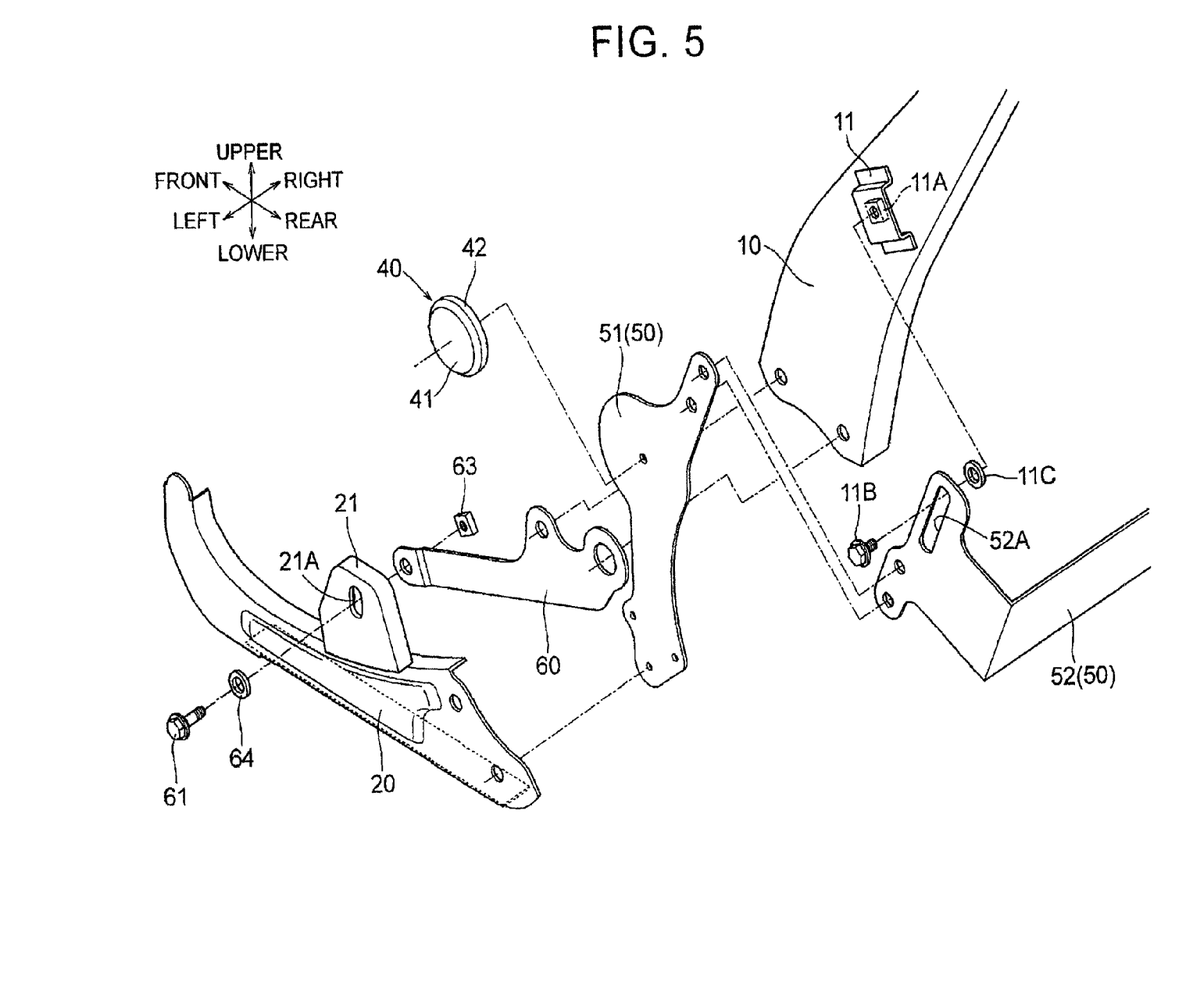
FIG. 5 is an exploded perspective view of main parts of the embodiment.

FIG. 1 shows a characteristic structure of the foregoing embodiment schematically and briefly. In the drawing, the back frame 10 and the cushion frame 20 are illustrated as quadrangle masses. The bracket 50 is illustrated as a single member. Moreover, a structure such as the bracket 50, which moves the back frame 10 and the cushion frame 20 rotationally along with an adjustment of an inclination angle of the back frame 10, is provided only on one side of the seat. The fixed side 41 of the recliner 40 is supported with respect to the base member 30 that is fixed to the floor F of the automobile. The bracket 50, which supports the back frame 10 so that the back frame 10 is able to move, is fixed to the rotation side 42 of the recliner 40. The cushion frame 20 is supported so that the cushion frame 20 is able to move with respect to the base member 30, and the cushion frame 20 is connected with the end portion of the bracket 50 so as to function simultaneously with the bracket 50. The cushion frame 20 and the back frame 10 are connected with each other by the lower arm 60. The back frame 10 is guided with respect to the bracket 50, and the cushion frame 20 is guided with respect to the base member 30 respectively by the shoulder bolt 11B, the sliding hole 52A, the sliding pin 22, and the sliding hole 33 that structure the respective guide mechanisms, so that the back frame 10 and the cushion frame 20 are moved rotationally about a position corresponding to a hip-point of a seated occupant, as the bracket 50 rotates about the recliner 40 with an adjustment of an inclination angle of the back frame 10.

Figure 6:
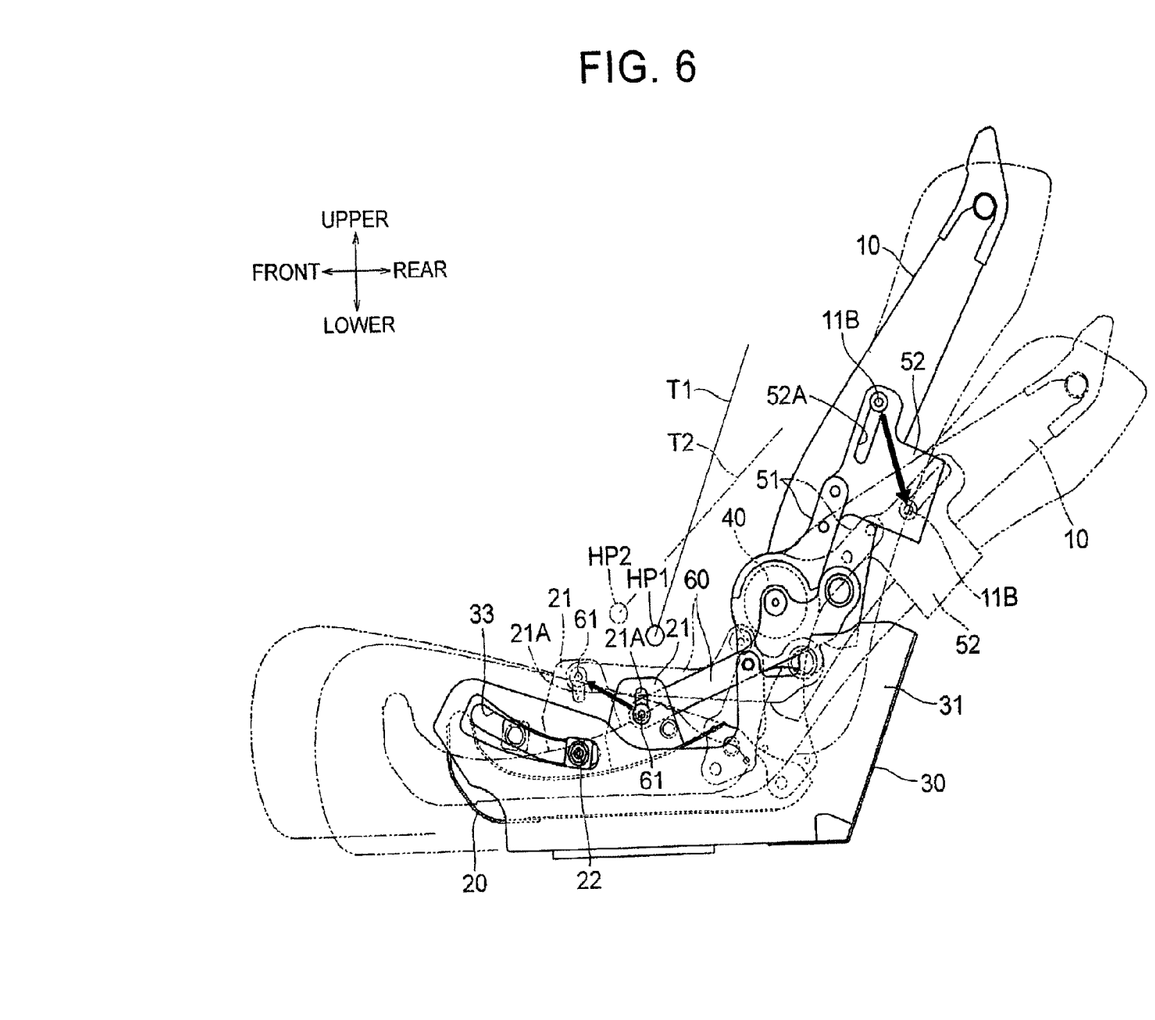
FIG. 6 is an explanatory view for explaining an operation of the embodiment.

Explained next are operations of the back frames 10 and the cushion frames 20 when adjusting an inclination angle of the seat back with respect to the seat cushion. The left and right back frames 10 and the cushion frames 20 move in synchronization with each other. Therefore, in the explanation below, only the back frame 10 and the cushion frame 20 on the left side will be explained based on FIG. 6. An adjustment of an inclination angle of the seat back with respect to the seat cushion is carried out merely in opposite directions when the inclination angle is increased (tilting the seat back rearward) and reduced (tilting the seat back forward). Therefore, the explanation below pertains only to the case where the seat back is tilted rearward, and the explanation of the case where the seat back is tilted forward will be omitted. In FIG. 6, an external shape including the cushion pad and the seat cover for the seat back and the seat cushion, which are not illustrated in the other drawings, is shown by a virtual line so as to facilitate understanding of each of the operations. Once the occupant presses an upper part of the back frame 10 to the rear in order to unlock the recliner 40 and tilt the seat back rearward, the upper arm 52 is pushed to the rear through the shoulder bolt 11B, and the upper arm 52 and the link member 51 rotate in a clockwise direction in FIG. 6 about the recliner 40 that serves as a hinge center. As a result, the cushion frame 20 connected to the lower end of the link member 51 is pushed to the front, and the cushion frame 20 is moved to the front and also slightly upwardly with respect to the base member body 31 along the sliding hole 33 through the sliding pin 22. As the cushion frame 20 is moved to the front as explained above, the back frame 10 is also pulled to the front through the lower arm 60, and the back frame 10 is moved forward and downward along the sliding hole 52A through the shoulder bolt 11B.

Once the seat back is tilted rearward, the back frame 10 and the cushion frame 20 are moved in the clockwise direction in FIG. 6 about a position corresponding to a hip-point of an occupant seated in the seat. As a result, the occupant, whose hip-point and torso line are at a position HP1 and a position T1, respectively, tilts the seat back rearward so that the torso line comes to T2. Then, the shoulder bolt 11B of the back frame 10, and the cushion frame bracket 21 of the cushion frame 20 move as shown by thick arrows, and the back frame 10 and the cushion frame 20 move as shown by the virtual line from a solid line position, as stated above. Therefore, the hip-point of the occupant moves to HP2. Also, it is possible to prevent a phenomenon that the seat back rises gradually while in contact with the back of the occupant. Therefore, it is possible to prevent the back shift, in which clothing of an occupant crawls up on the back of the occupant.

According to the foregoing embodiment, the back frame 10 is supported by the bracket 50 at a position away from the recliner 40. However, since the link members 51 on both sides of the back frame 10 are integrated with each other by the upper arm 52 so as to sandwich the back frame 10, it is possible to prevent the link members 51 from being deformed to be separated from each other, thus enhancing strength for supporting the back frame 10.

The specific embodiment has been explained so far. However, the present invention is not limited to an appearance and structure of the embodiment, and various changes, additions, deletions may be made without changing the gist of the present invention. For example, the bracket fixed to the rotation side of the recliner is made of two members, which are the upper arm and the link member, but may be formed integrally from one member. In the foregoing embodiment, the lower arm (a connecting member) that connects the seat cushion with the seat back is provided on both sides of the seat. However, only one lower arm may be provided in the center of the seat in the width direction. In the foregoing embodiment, the lower arm (the connecting member) is connected to the seat cushion so that the lower arm is able to move with respect to the seat cushion. However, the lower arm may be connected to the seat back so that the lower arm is able to move with respect to the seat back, or may be connected to both the seat cushion and the seat back so that the lower arm is able to move with respect to the seat cushion and the seat back. In the foregoing embodiment, the connection between the lower arm (the connecting member) and the seat cushion is realized by engagement between the long hole on the seat cushion side and a connecting pin on the lower arm side. However, the connection between the lower arm and the seat cushion may be realized by connecting the lower arm with a distal end of a rotating link so that the lower arm is able to rotate, the rotating link being connected to the seat cushion side so that the rotating link is able to rotate. In the foregoing embodiment, each of guiding units on the seat back side and the seat cushion side is structured by the combination of the sliding pin and the sliding hole. However, the guiding unit may be structured by a link mechanism made by a combination of link members. In the foregoing embodiment, the base member is fixed onto the slide rail, and the seat is thus able to move by sliding. However, the present invention may be applied to a seat in which a base member is directly fixed to a floor of a vehicle and is thus unable to move by sliding. In the foregoing embodiment, the example was explained, in which the present invention is applied to an automobile seat. However, the present invention may be applied to a vehicle seat in a vehicle other than an automobile, such as an airplane and a ship.

What is claimed is:

1. A vehicle seat, which adjusts an inclination angle of a seat back with respect to a seat cushion through a recliner, comprising:
    a base member, which is fixed to a floor of a vehicle in which the vehicle seat is installed, and supports a fixed side of the recliner;
    a bracket, which supports the seat back so that the seat back is able to move, and is fixed to a rotation side of the recliner so that the bracket moves with the seat back and the angle of the seat back with respect to the bracket remains constant;
    a connecting member that connects the seat cushion and the seat back with each other;
    a first guide mechanism that guides the seat back with respect to the bracket, the first guide mechanism including a sliding hole provided in one of the bracket and the seat back, and a shoulder bolt slidable in the sliding hole, the shoulder bolt fastened to the other of the one of the bracket and the seat back; and a second guide mechanism that guides the seat cushion with respect to the base member, wherein the seat cushion is supported so as to be able to move with respect to the base member, and is connected to an end portion of the bracket so as to operate simultaneously with the bracket, and the seat back and the seat cushion are guided by the first guide mechanism and the second guide mechanism, respectively, so that the seat back and the seat cushion move rotationally about a position corresponding to a hip-point of a seated occupant as the bracket rotates about the recliner with an adjustment of an inclination angle of the seat back.

2. The vehicle seat according to claim 1, wherein the recliner and the bracket are provided on both sides of the seat back, and the brackets on both sides are integrally fixed to each other on a back side of the seat back.

3. The vehicle seat according to claim 1, wherein the connecting member is integrally fixed to an end portion of the seat back on the seat cushion side, and, for the seat cushion, the connecting member is engaged with a sliding groove, which is formed on the seat cushion side, through a sliding pin, and the sliding groove is formed so as to allow the seat back to move with respect to the seat cushion with an adjustment of an inclination angle of the seat back.

4. The vehicle seat according to claim 2, wherein the connecting member is integrally fixed to an end portion of the seat back on the seat cushion side, and, for the seat cushion, the connecting member is engaged with a sliding groove, which is formed on the seat cushion side, through a sliding pin, and the sliding groove is formed so as to allow the seat back to move with respect to the seat cushion with an adjustment of an inclination angle of the seat back.

* * * * *